United States Patent
Kanaris

Patent Number: 5,934,447
Date of Patent: *Aug. 10, 1999

[54] SPROCKET DRIVE WITH CYLINDRICAL KEYS

[76] Inventor: Alexander Dimitrius Kanaris, 14 Miriam Crescent, Richmond Hill, Ontario, Canada, L4B 2P7

[*] Notice: This patent issued on a continued prosecution application filed under 37 CFR 1.53(d), and is subject to the twenty year patent term provisions of 35 U.S.C. 154(a)(2).

[21] Appl. No.: 08/912,023

[22] Filed: Aug. 15, 1997

[51] Int. Cl.$^6$ .................................................. B65G 23/06
[52] U.S. Cl. ............................................ 198/834; 403/356
[58] Field of Search ........................... 198/834; 403/355, 403/356; 474/156, 157, 164, 902, 903

[56] References Cited

U.S. PATENT DOCUMENTS

| | | | |
|---|---|---|---|
| 3,213,703 | 10/1965 | Fitzgerald | 198/834 X |
| 5,076,544 | 12/1991 | Mueller | 403/356 X |
| 5,156,263 | 10/1992 | Ledet | 198/834 |
| 5,253,748 | 10/1993 | Ledet | 198/834 |
| 5,469,958 | 11/1995 | Gruettner et al. | 198/834 |
| 5,518,109 | 5/1996 | Dailey et al. | 198/834 |
| 5,531,537 | 7/1996 | Pink et al. | 403/356 |
| 5,544,740 | 8/1996 | Kissee | 198/834 |

*Primary Examiner*—James R. Bidwell
*Attorney, Agent, or Firm*—George A. Rolston; H. Jay Spiegel

[57] ABSTRACT

A roller drive sprocket system, in which a drive roller mounts sprockets for driving a belt, and having a general cylindrical drive drum, semi-cylindrical grooves formed axially along the surface of the drive drum, sprockets formed of plastic with drive teeth for driving a belt, cylindrical metal keys located in the sprockets, spaced radially, the keys fitting in the semi-cylindrical grooves in the surface of the cylindrical drive drum, portions of the keys extending inwardly to interengage with the semi-cylindrical grooves.

20 Claims, 3 Drawing Sheets

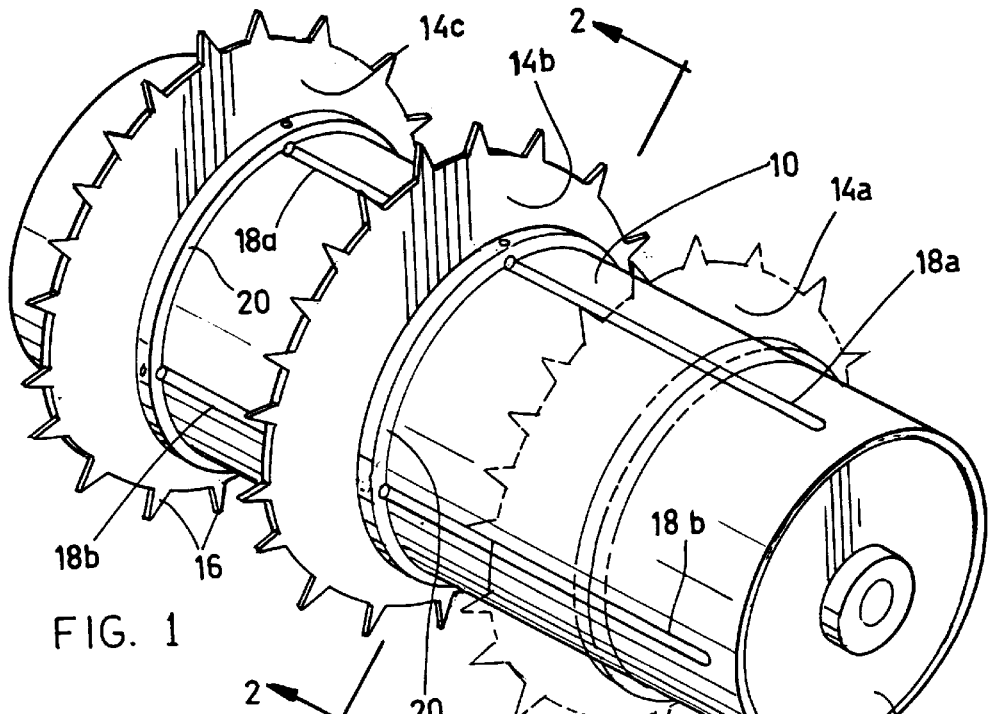
FIG. 1
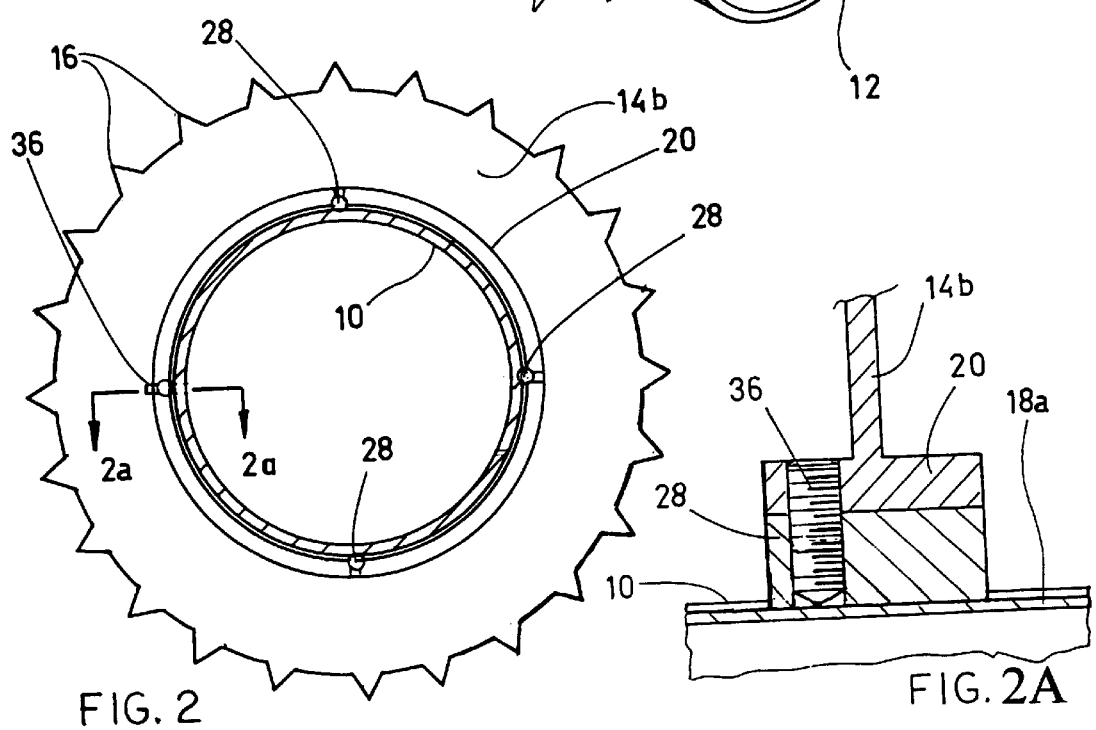
FIG. 2
FIG. 2A

SPROCKET DRIVE WITH CYLINDRICAL KEYS

FIELD OF THE INVENTION

The invention relates to a sprocket drive drum, for driving sprockets controlling a moving belt, and in particular, in which all but one of the sprockets are slidable to and fro along the drum, to accommodate minor misalignments of the belt.

BACKGROUND OF THE INVENTION

The use of cylindrical drums for driving sprocket driven belts has been well known for many years. Recent examples are shown in U.S. Letters Patents:

U.S. Pat. No. : 5,156,263

Title: MODULAR CONVEYOR BELT SEALED SPROCKET DRIVE SYSTEM

Inventors: Brent A. Ledet, Kenner, La.

Issued: Oct. 20, 1992

U.S. Pat. No. : 5,253,748

Title: MODULAR CONVEYOR BELT SEALED SPROCKET DRIVE SYSTEM

Inventors: Brent A. Ledet, Kenner, La

Issued: Oct. 19, 1993

The sprockets are required to drive belts carrying various kinds of product, and the sprockets have teeth which engage the belt and drive it.

In order to accommodate minor misalignments of the belt, it is customary to key the sprockets onto the drum in such a way that they can move somewhat from side to side, along the drum, while still transmitting torque to the belt.

One early system for providing drive for sprockets on a drum, devised by Van der Graaf, Inc. of Toronto, consisted simply of securing rectangular bars to the exterior of the drum. In the case of the Van der Graaf units, the drums were driven by internal motors and gear systems unique to Van der Graaf.

In the two U.S. patents referred to, the keying of the sprockets on the drive drum was proposed to be achieved by, for example, octagonal flat surfaces formed on the surface of the drum and complimentary octagonal surfaces formed in the sprockets. The patents also suggest other keying systems.

However, most of these keying systems had certain disadvantages. For various reasons the sprockets are made of plastic material while the drums or rollers are made of steel. The keying systems used whether they are octagonal surfaces or notches or teeth, are simply cut out of the plastic material. The plastic material is engaged by the steel of the drive roller or drum itself. There is continuous friction and eventually wear will take place, requiring replacement or repair of the sprockets.

Another factor in the design of these types of sprockets and drive rollers, is the fact that the sprockets must necessarily move sideways to accommodate minor misalignments of the belt steering operation. These misalignments are inevitable, and are a natural function of the movement of the belt over the drive sprockets. The sprockets are fitted on the drive drum or roller somewhat loosely, so that this side to side movement can take place without interfering with the action of the belt itself, and without causing undue strains on the sprockets.

However, in all of these earlier designs there was contact between the inner edge or surface of the sprocket, and the surface of the drive drum or roller, around the full 360-degree extent. As a result, either the clearance between the sprockets and the drum was sufficiently loose to allow free sideways movement, in which case the sprockets might rapidly become worn, or else, if there was insufficient clearance, these sprockets could not move sideways, with the desired degree of freedom.

Clearly, it is desirable to provide a system in which the actual drive could be transmitted from the drive drum to the sprocket by metal to metal contact, and in which clearance space is provided between each sprocket and the drum, so that there is less wear between the plastic fabric of the sprocket, and the metal surface of the roller.

BRIEF SUMMARY OF THE INVENTION

With a view to providing a roller drive sprocket system, wherein a drive roller mounts a plurality of sprockets for driving a belt, and wherein most of the sprockets are moveable to allow for minor misalignments of the belt, the invention comprises a general cylindrical drive drum, a plurality of semicircular grooves formed axially along the surface of the drive drum at spaced intervals radially there around, a plurality of sprockets formed of plastic material, said sprockets having a generally annular configuration, with externally facing drive teeth at spaced intervals, for driving a belt, and having internal generally cylindrical surfaces, the cylindrical surfaces defining a radius greater than the radius of the drive drum, and defining a clearance space between the cylindrical inner surfaces of the sprockets and the outer cylindrical surface of the drive drum, and, a plurality of cylindrical metal keys, embedded in said cylindrical inner surface of said sprockets, spaced radially therearound, said plurality of keys corresponding to respective said semicylindrical grooves in the surface of said cylindrical drive roller, and drive portions of said cylindrical keys extending radially inwardly from said cylindrical inner surfaces of said sprockets, whereby to interengage with respective said semicylindrical grooves, to provide a positive metal-to-metal torque engagement between said drive drum and said sprockets, while maintaining said cylindrical surfaces of said plastic sprockets out of contact with said drive roller surface.

The invention is particularly applicable to cylindrical drive rollers having internal motors and gear reduction drive, although the invention is not exclusively restricted thereto.

Usually in the practice of the invention there will be three or more sprockets on one such roller. In this case, the central or one of the intermediate sprockets will be secured to the drive roller, so that it is nonslidable relative thereto, while the remaining said sprockets may slide, with their respective metallic cylindrical keys sliding in respective semicylindrical grooves of the metallic drive drum.

The invention further provides that the plastic sprockets will be formed with cylindrical recesses at spaced intervals, for receiving said cylindrical keys therein, and said cylindrical recesses defining inwardly directed openings, whereby portions of said keys are exposed inwardly for interengagement with said respective semicylindrical grooves.

The keys are preferably held in their respective cylindrical recesses by means of set screws in threaded recesses. One of the set screws maybe made of greater length than the others, so that it extends right through the key, and enters into the cylindrical groove, so that the set screw maybe tightened down thereby locking the one sprocket in position on the roller.

In one embodiment of the invention, the set screws may be used in pairs, so that there is an inner set screw, which enters first into the threaded recess, and a second set screw is then threaded into the recess behind the first set screw, and is tightened up so as to lock the first set screw in position.

The various features of novelty which characterize the invention are pointed out with more particularity in the claims annexed to and forming a part of this disclosure. For a better understanding of the invention, its operating advantages and specific objects attained by its use, reference should be made to the accompanying drawings and descriptive matter in which there are illustrated and described preferred embodiments of the invention.

IN THE DRAWINGS

FIG. 1 is a perspective illustration of a drive roller in accordance with the invention, showing two sprockets thereon, and a third sprocket being shown in phantom;

FIG. 2 is a section along the line 2—2 of FIG. 1;

FIG. 2A is a section along line 2A—2A of FIG. 2;

DESCRIPTION OF A SPECIFIC EMBODIMENT

Figure 4:
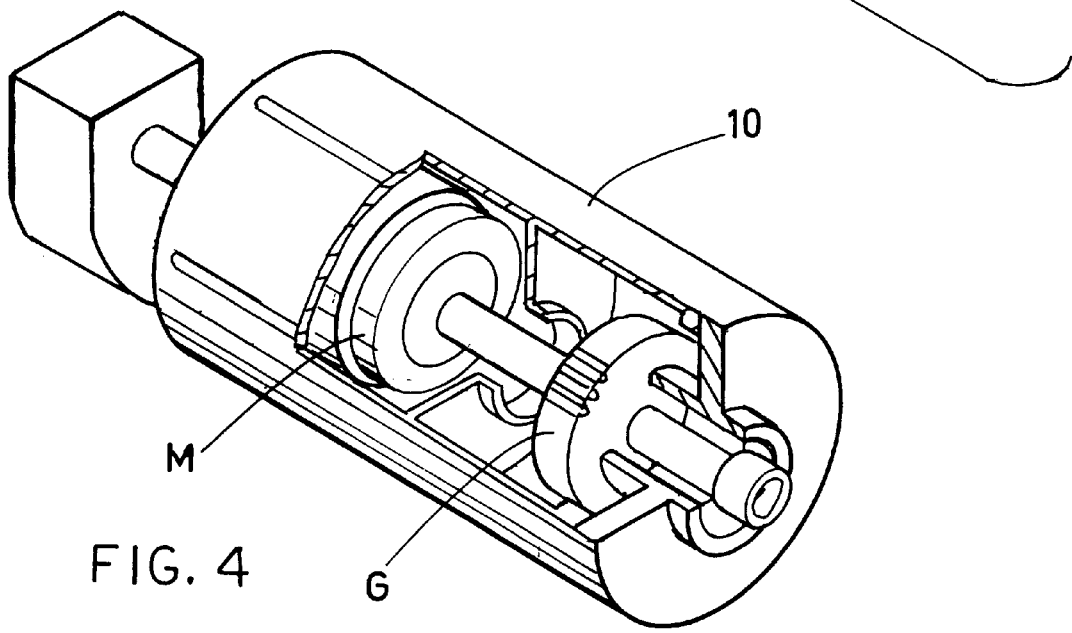
FIG. 4 is a partially cut away perspective of the internal motor drive of the preferred form of drive roller.

As already explained, the invention relates to sprockets for driving belts, in which the sprockets are mounted on drive rollers. The drive rollers may be driven by internal as illustrated in FIG. 4, or may be driven by other means, depending upon the particular application.

As illustrated in FIG. 1, the drive roller will consist of a cylindrical steel drum 10, having end plates 12, and any suitable shaft means (not shown) extending from either end, by means of which it may be mounted in suitable bearings (not shown).

Sprockets, in this case three such sprockets, are indicated generally as 14A, 14B and 14C. Such sprockets typically are formed with external teeth 16, for engaging suitable link portions of a belt (not shown) such as is well known in the art.

As best shown in FIG. 1, and also in FIG. 2, the drum 10 is formed with, in this case, four semi-cylindrical grooves 18A, 18B, 18C and 18D along its length. As shown in FIG. 1, the grooves are discontinuous at each end of the drum, for reasons to be described.

The sprockets 14, are formed in this particular case, typically of thermoplastic material, and having a predetermined thickness Collars 20 are formed integrally with sprockets 14 and have a width greater than the thickness of said sprockets 14, and extend laterally on either side of sprockets 14, and define opposite ends.

The internal collars 20 define cylindrical interior surfaces 22.

The interior surfaces 22 define a radius which is slightly greater than the radius of the surface of the roller 10, so as to provide a slack clearance between the collar 20 and the drum 10.

At spaced intervals around the collar 20, there are formed generally cylindrical recesses 24. The cylindrical recesses 24 which extend around about 220 to 270 degrees define inwardly open gaps 26 spaced apart by a distance less than the diameter of the cylindrical recess 24. Recesses 24 extend through the collars from one end to the other of each collar, and are open at each end of the collar.

Figure 3:
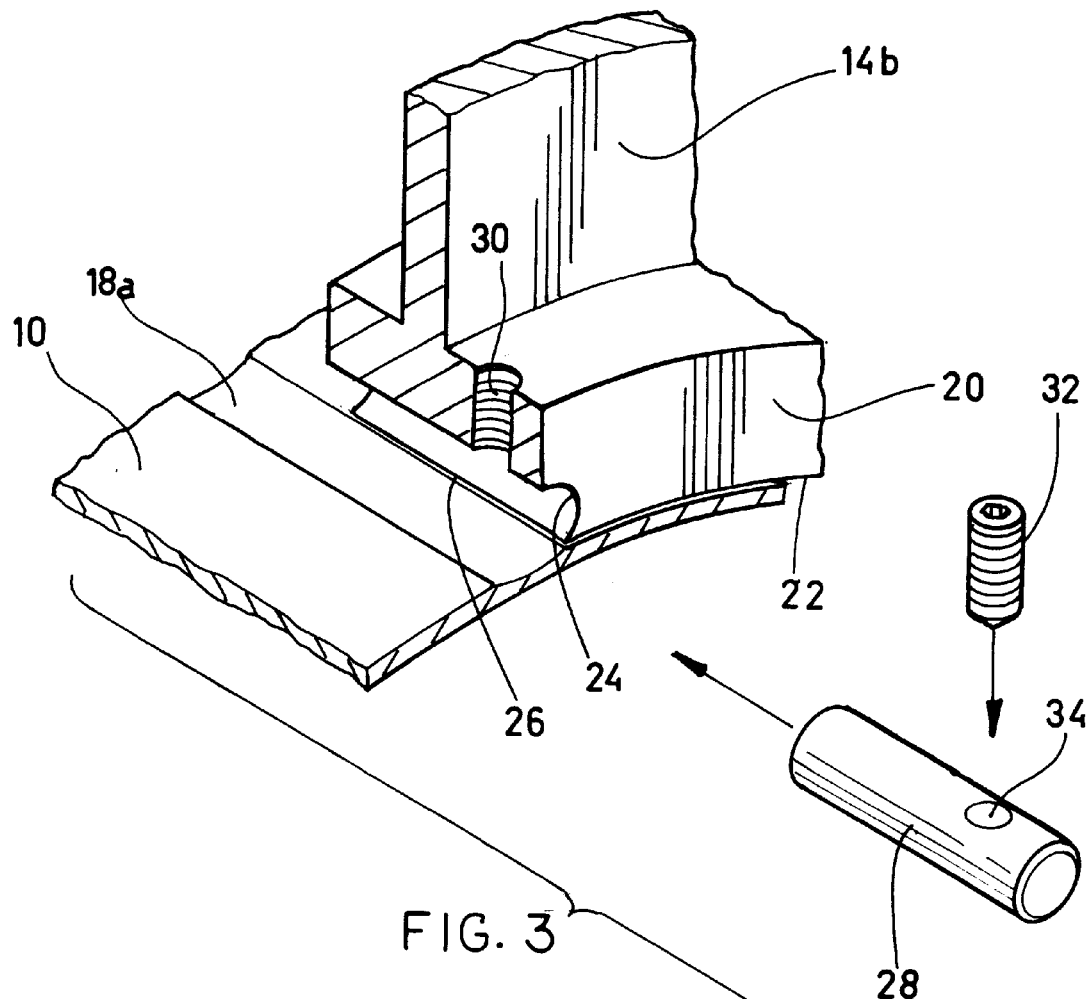
FIG. 3 is an exploded perspective illustration of the portion of the sprocket containing the key, and also showing the key and the set.

Within each of the recesses 24, there is provided a cylindrical steel key 28. The key 28 makes a snug fit in the cylindrical recess 24, and a segment of the key 28 extends out through the gap or slot 26. (FIG. 3.) into a respective groove 18.

A threaded inwardly directed opening 30 is formed in the collar 20 of each sprocket 14, registering and communicating at right angles with the cylindrical recess 24 for the key 28.

A set screw 32 is threadedly received in the threaded recess 30, and is received in a corresponding recess 34 in the key 28.

In this way, the keys 28 can be slid endwise, along one of grooves 18 into their respective recesses 24, from one end of a recess and then can be securely engaged and held in the recesses, by means of the said screws so that the keys 28 cannot escape.

As is well known, there is a tendency on this type of belt drive for the belt itself to wander or move sideways and misalign itself slightly. It is desirable to allow for a minor degree of misalignment. For this reason, the two sprockets 14A and 14C, can slide to a minor extent, sideways. The keys 28 will ride in their corresponding grooves 18, and allow a sliding movement while maintaining a good metal-to-metal torque.

The central sprocket 14B however is secured in position so as to prevent any major misalignment of the belt. This securing of the central sprocket 14B is achieved by providing a set screw 36 (FIG. 2A) which is longer than the rest of the set screws. In this case, the recess 34 in the key 28 extends all the way through the key. The set screw 36 is then simply tightened down until it securely engages the semi-cylindrical groove, and in this way, the sprocket 14B cannot slide to and fro.

Figure 5:
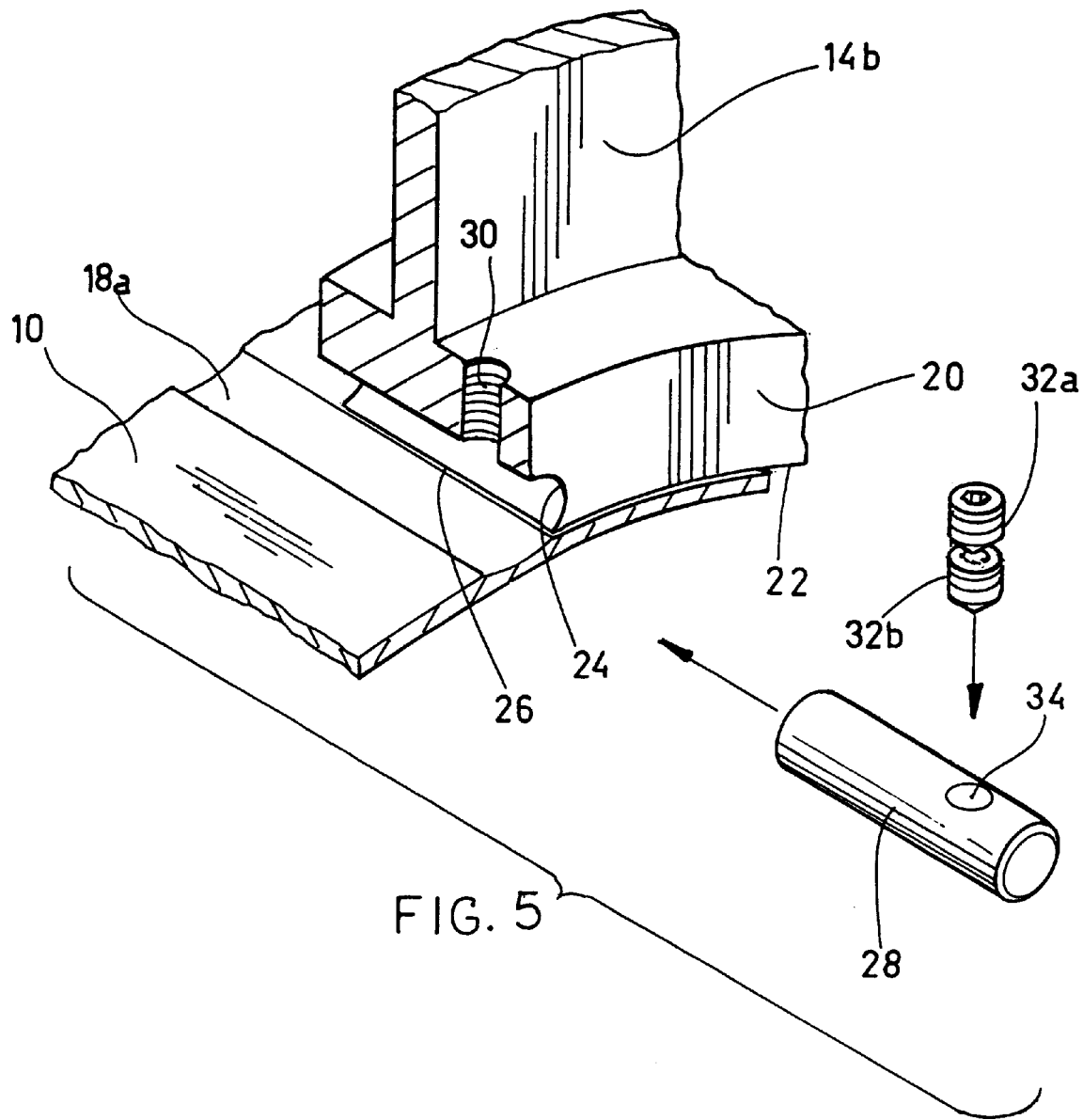
FIG. 5 is an exploded perspective illustration of an alternate embodiment of the invention using a pair of set screws; and, FIG. 6 is a sectional illustration corresponding to FIG. 2A, showing an alternate embodiment.
Figure 6:
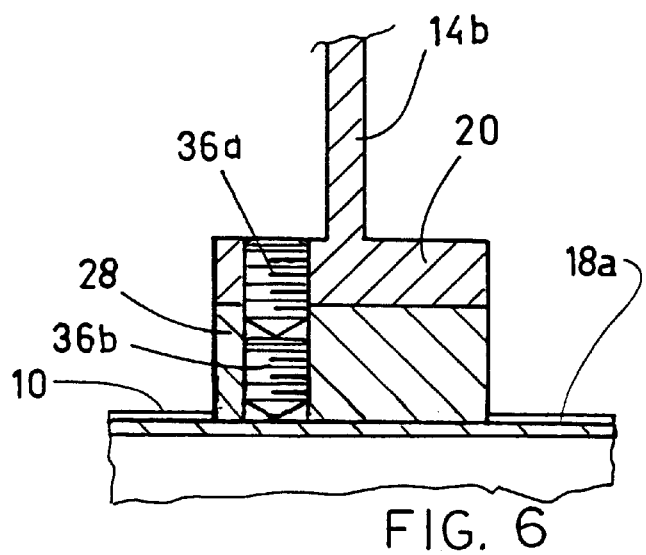

A further embodiment is shown in FIGS. 5 and 6. In this case, the single set screw 36 of the embodiments of FIGS. 1 through 4 is replaced by pairs of set screws. In the FIG. 5 embodiment pairs of set screws 32A and 32B are used, to hold the key 28 in position. The inner set screw 32B is inserted first into the recess 30, and the second set screw 32A is then inserted behind the set screw 32B and is tightened up against it so as to prevent it from becoming loosened.

In the FIG. 6 embodiment, a pair of set screws 36A and 36B are shown. The set screw 36B enters completely through the pin 28, and engages the roller 10.

The second set screw 36A is then inserted and tightened up behind it so as to prevent it from becoming dislodged.

The manufacturer of the cylindrical sprocket and semi-cylindrical grooves is relatively easy to carry out with a great degree of precision. The use of the blind ends on the grooves 18 prevents the sprockets 14 from sliding off one end of the roller.

Assembly of the sprockets on the roller is simple to achieve, since they can simply be slid onto the roller, without their keys 28 in position. Once on the roller, the keys 28 can simply be inserted into their recesses 24 and the set screws 32 tightened up.

All of these numerous manufacturing and assembly advantages lead to a greatly improved drive roller for such belts, which is both easier and more economical to make, and at the same time has a greatly increased working life, since all torque is carried through metal to metal contact without friction as between plastic and metal, as was the case in other such drives.

The foregoing is a description of a preferred embodiment of the invention which is given here by way of example only. The invention is not to be taken as limited to any of the specific features as described, but comprehends all such variations thereof as come within the scope of the appended claims.

What is claimed is:

1. A roller drive sprocket system, wherein a drive roller mounts a plurality of sprockets for driving a belt, and wherein most of the sprockets are moveable to allow for minor misalignments of the belt, and comprising;
    a generally cylindrical drive drum having an axis of elongation;
    a plurality of arcuate cross-section grooves formed parallel to said axis along the surface of the drive drum at spaced intervals circumferentially therearound;
    a plurality of sprockets formed of plastic material, each of said sprockets having a generally annular configuration, with externally facing drive teeth at spaced intervals, for driving a belt, and having a predetermined thickness;
    inner generally cylindrical surfaces formed on each of said sprockets, the cylindrical surfaces defining a radius greater than the radius of the drive drum and defining a clearance space between the cylindrical inner surfaces of the sprockets and the outer cylindrical surface of the drive drum;
    a plurality of arcuate cross-section recesses formed in said inner surfaces of said sprockets, said recesses defining gaps open inwardly toward said drum, and extending from one end of each of said sprockets to another end thereof;
    a key having arcuate outer surfaces generally complementary to surfaces of said recesses and grooves, slidably inserted from one said end of each of said sprocket recesses into a respective one of said recesses and secured in a said recess and constrained to move with a said sprocket and to move with respect to said drum, each of said keys having an outer surface corresponding to, respectively, said grooves in the surface of said cylindrical drive drum; and
    drive portions of said keys extending radially inwardly through said gaps from said recesses in said sprockets, whereby to interengage with respective said grooves, to provide a positive metal-to-metal torque engagement between said drive drum and said sprockets.

2. A roller drive sprocket system as claimed in claim 1 wherein said cylindrical drive rollers having internal motors and gear reduction drives.

3. A roller drive sprocket system as claimed in claim 1 wherein there are at least three or more sprockets on one such roller.

4. A roller drive sprocket system as claimed in claim 1 wherein a central or one of the intermediate sprockets will be secured to the drive roller, so that it is non-slidable relative thereto, while the remaining said sprockets may slide, with their respective metallic keys sliding in respective grooves of the metallic drive drum.

5. A roller drive sprocket system as claimed in claim 1, wherein said recesses define inwardly directed fastening openings, for receiving fastening means for fastening each key to a respective one of said sprockets.

6. A roller drive sprocket system as claimed in claim 5 wherein said keys are held in position in said recesses by set screws.

7. A roller drive sprocket system as claimed in claim 6 wherein said set screws have a predetermined length, and including one further set screw having a length greater than the others.

8. A roller drive sprocket system as claimed in claim 6, and wherein each of said keys is secured in position by pairs of respective first and second set screws, and wherein said first set screws in each pair are inserted so as to engage a said key, and the second of said set screws of said pairs is inserted so as to tighten up on said first set screw and lock it in position.

9. A roller drive sprocket system as claimed in claim 8, and wherein said first set screw of one said pair has a predetermined length and is adapted to pass completely through a said key, and engage the surface of said roller, and wherein the second set screw in said pair is adapted to be inserted to engage said first set screw of said pair, and lock it in position.

10. A roller drive sprocket system, wherein a drive roller mounts a plurality of sprockets for driving a belt, and wherein most of the sprockets are moveable to allow for minor misalignments of the belt, and comprising;
    a generally cylindrical drive drum;
    a plurality of arcuate cross-section grooves formed axially along the surface of the drive drum at spaced intervals radially therearound;
    a plurality of sprockets formed of plastic material, said sprockets having a generally annular configuration, with externally facing drive teeth at spaced intervals, for driving a belt;
    internal generally cylindrical surfaces formed on said sprockets, the cylindrical surfaces defining a radius greater than the radius of the drive drum; and
    defining a clearance space between the cylindrical inner surfaces of the sprockets and the outer cylindrical surface of the drive drum;
    a plurality of metal keys having arcuate outer surfaces generally complementary to surfaces of said recesses and grooves, secured in said cylindrical inner surfaces of said sprockets, spaced circumferentially therearound, said plurality of keys corresponding to respective ones of said grooves in the surface of said cylindrical drive roller;
    inwardly directed openings in said sprockets normal to said recesses;
    set screws received in said inwardly directed openings and engaging said keys and holding them in position in respective ones of said inner surfaces of said sprockets whereby said keys are constrained (1) to move with respective sprockets to which they are fastened and (2) to move with respect to said grooves; and
    drive portions of said keys extending radially inwardly from said cylindrical inner surfaces of said sprockets, whereby to interengage with respective ones of said grooves, to provide a positive metal-to-metal torque engagement between said drive drum and said sprockets, while maintaining said cylindrical surfaces of said plastic sprockets out of contact with said drive roller surface.

11. A roller drive sprocket system as claimed in claim 10 wherein said set screws have a predetermined length, and including one further set screw having a length greater than the others.

12. A roller drive sprocket system as claimed in claim 11, and wherein at least one of said on at least one of said sprockets is secured in position by pairs of respective first and second set screws, and wherein said first set screws in each pair are inserted so as to engage a said key, and the second of said set screws of said pairs is inserted so as to tighten up on said first set screw and lock it in position.

13. A roller drive sprocket system as claimed in claim 12, and wherein said first set screw of one said pair has a predetermined length and is adapted to pass completely through a said key, and engage the surface of said roller, and wherein the second set screw in said pair is adapted to be inserted to engage said first set screw of said pair, and lock it in position.

14. A roller drive sprocket system wherein a drive roller mounts at least one sprocket for driving a belt, comprising:
   a) a generally cylindrical drive drum having an axis of elongation and at least one arcuate cross-section groove formed in an outer surface of said drum parallel to said axis;
   b) a sprocket mounted on said drum and having a generally cylindrical opening having a radius slightly greater than a radius of said outer surface of said drum and having an axis of elongation;
   c) an arcuate cross-section recess in said opening parallel with said axes and alignable with said groove;
   d) a key having arcuate outer surfaces generally complementary to surfaces of said recess and groove insertable laterally into said recess and groove, when they are aligned; and
   e) locking means for locking said key in said recess whereby said key is constrained to move with said sprocket and may move with respect to said groove.

15. The system of claim 14, wherein said recess comprises a recess having a circumferential extent greater than a semi-cylinder.

16. The system of claim 15, wherein said part-cylindrical recess has an opening defined by edges intersecting with said sprocket opening, said edges being spaced apart by a distance less than a diameter of said semi-cylinder.

17. The system of claim 16, whereby said key has surfaces extending beyond said edges and into said groove, said edges preventing said key from dropping out of said recess radially of said opening.

18. The system of claim 15, further including a plurality of grooves and a corresponding plurality of recesses in said sprocket.

19. The system of claim 18, further including a plurality of sprockets.

20. The system of claim 19, wherein said grooves are shorter, axially, than an axial length of said drum.

* * * * *